United States Patent [19]

Hanazono et al.

[11] 4,044,394
[45] Aug. 23, 1977

[54] THIN FILM MAGNETIC HEAD WITH A CENTER TAP

[75] Inventors: Masanobu Hanazono; Osamu Asai, both of Hitachi; Kunio Ono, Katsuta, all of Japan

[73] Assignee: Hitachi, Ltd., Japan

[21] Appl. No.: 673,523

[22] Filed: Apr. 5, 1976

[30] Foreign Application Priority Data

Apr. 7, 1975  Japan .................................. 50-41304

[51] Int. Cl.² .......................... G11B 5/20; G11B 5/28
[52] U.S. Cl. .................................... 360/123; 360/121; 360/125
[58] Field of Search ............... 360/123, 126, 122, 125, 360/121, 119

[56] References Cited

U.S. PATENT DOCUMENTS

| | | | |
|---|---|---|---|
| 3,344,237 | 9/1967 | Gregg | 360/123 |
| 3,639,699 | 2/1972 | Tiemann | 360/126 |
| 3,846,841 | 11/1974 | Lazzari et al. | 360/125 |
| 3,867,368 | 2/1975 | Lazzari | 360/125 |
| 3,891,995 | 6/1975 | Hanazono et al. | 360/123 |

OTHER PUBLICATIONS

IBM Tech. Disc. Bulletin, E. Max, Thin-Film Magnetic Head, vol. 13, No. 1, June 1970, pp. 248-249.

*Primary Examiner*—Alfred H. Eddleman
*Attorney, Agent, or Firm*—Craig & Antonelli

[57] ABSTRACT

A narrow track width magnetic head can be formed using an integrated circuit formation techniques such as evaporation plating, chemical etching, etc. But, there has been such a problem that it is difficult to provide a center tap in a conventional thin film magnetic head structure including coils of four or more turns. A magnetic head according to the present invention comprising a coil divided into two sections by the center tap, the electrostatic capacitance of each section being substantially the same. The coil may be formed into a precise pattern with ease by photoetching technique. A plurality of sets of conductive films insulated from one another are provided crossing a magnetic core, each set consisting of two conductive films of the same pattern. The alternating layers of the conductive films are connected on the backward of a magnetic gap to provide the two sections of the coil. A center tap is derived from a connection portion of the two sections of the coil and a coil terminal is provided at each of the opposite free ends of the coil. Thus, the thin film magnetic head having a multi-turn coil with a center tap is provided.

5 Claims, 20 Drawing Figures

THIN FILM MAGNETIC HEAD WITH A CENTER TAP

BACKGROUND OF THE INVENTION

The present invention relates to a structure of a thin film magnetic head provided with a coil whose electrostatic capacitance is the same on both sides of its center tap.

For use in recording or reading in electronic computers or acoustic devices, a magnetic head having a center tap has the advantages of easy switching from writing to reading or vice versa and a very easy selection of tracks by means of an X-Y switch in comparison with a two-terminal magnetic head. The two-terminal head can be used as a center-tapped magnetic head by being provided with an additional pulse transformer with three terminals on the primary side. The use of the additional pulse transformer is not, however, preferable because it makes the magnetic head bulky.

There is a wide track width magnetic head using a magnetic core in which a coil is wound with a double-stranded wire and a center tap is derived from the connection portion of the double-stranded wire. Such a magnetic head has the drawback that a plurality of the thus bulky magnetic heads cannot be formed on one substrate because of their large bulk. There is, therefore, a proposal in which the magnetic head should be formed by thin films for improvement in track density.

In U.S. Pat. No. 3,344,237, for example, there is disclosed a magnetic head having one-turn coil, which, however, requires a large amplification circuit because of its small input and output signals, and it is not possible to make smaller one as desired. German Layed-Open Patent Specification DOS No. 2,052,642, on the other hand, discloses a thin film magnetic head having a coil with plural winding turns, which employs a structure that the coils are expanding in proportion to the number of turn so that conductors may not overlap on the substrate, and thus has the drawback that it cannot form high-density magnetic heads. In such a magnetic head having a coil with its center tap derived from a central winding, the coil is different in inductance and in electrostatic capacitance depending upon whether it is on one side or the other of the center tap with the result that equalization can not be provided if we were not made fine adjustment to the amplifier circuit. This, therefore, leads to the new addition of inductances and capacitors to the circuit. The coil having the above-mentioned structure, for example, has a drawback that the inductance and electrostatic capacitance of one section of the coil is more than three times as great as that of the other section of the coil even if it has only several winding turns on each section.

Another example is shown in IEEE Transactions on Magnetics; Vol, Mag. 9, No. 3, (September 1973) P 322, in which a magnetic head has a coil with a center tap. The coil is wound in the same pattern as the first layer and the center tap is derived from the central turn of the windings. The head is formed by a mask evaporation method. In the ordinary mask evaporation method, however, a precise pattern cannot be obtained because films may not be deposited in a correct pattern as the mask. The inaccuracy, on the other hand, eliminates the danger of defective insulation or conduction on overlapping portions because deposited layers define a gentle inclination at their edge. If the head is desired to be formed in high density and in a correct pattern, then it must be formed by etching technique using a photomask. The formation of a magnetic head having the structure described in IEEE Transaction on Magnetics by the etching technique using the photomask requires the using which cannot aboid to step up the etched pattern. This produces many defects at this step, and permits no industrial manufacture of the head having such a structure.

If a magnetic head is intended to be manufactured with more precision and in higher density, then research must be made for pattern and structure suitably adapted for manufacturing process.

SUMMARY OF THE INVENTION

An object of the present invention is to provide a magnetic head with a center tap so that a plurality of the magnetic heads may be loaded on one and the same substrate in high density.

Another object of the present invention is to provide a magnetic head with a center tap suitable for formation using a thin film integrated circuit formation method.

Still another object of the present invention is to provide a magnetic head which is formed by thin films and includes a coil whose inductance and electrostatic capacitance are equal on both sides of the center tap.

The magnetic head according to the present invention comprises a magnetic material, a coil having a plurality of winding turns which surround the magnetic material, and a center tap derived from the central portion of the coil. The magnetic material is formed of a pair of magnetic films which are so superimposed that they are directly coupled at their one end and define at the other end a gap for providing a magnetic gap. The lower layer of the magnetic material may be formed by a thin film provided on the substrate. Alternatively, the lower layer of magnetic material may be so formed as to serve also as the substrate.

Between the pair of layer of the magnetic material where are provided coil conductors such that they cross the magnetic material and are wound around the lamination of the magnetic material. The coil consists of a plurality of conductors superimposed into layers which are insulated from one another and having the same pattern in two layers. Therefore, the coil has two sections each having substantially the same pattern and they being wound around the layer of magnetic material. One end of each of the two coil patterns is formed as a connection terminal to lead a conductor, the other ends being connected to each other to provide one coil having two sections. If the center tap is derived from the connected portion, then the coil is divided on opposite sides of the center tap into two halves each having substantially the same inductance and capacitance.

BRIEF DESCRIPTION OF THE DRAWINGS

FIG. 11 is a sectional view along a line XI—XI in FIG. 10a;

DESCRPTION OF PREFERRED EMBODIMENTS

Figure 1:
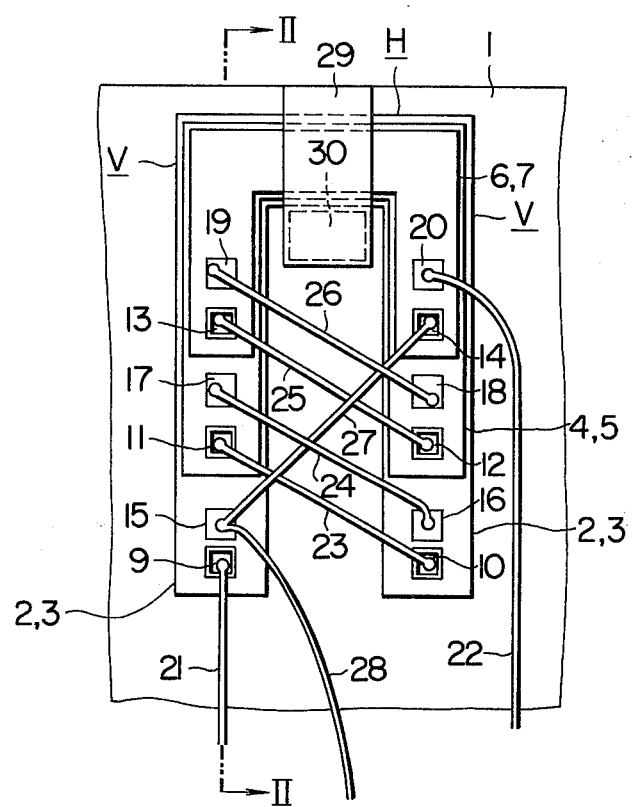
FIG. 1 is a plan view showing a fundamental embodiment of a magnetic head according to the present invention, wherein the wiring is illustrated by using lead wires for convenience of easy understanding, but in practice carried out by using thin film layers.
Figure 2:
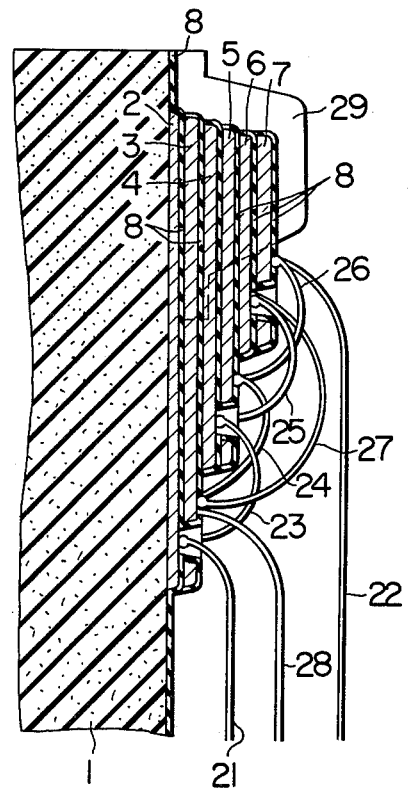
FIG. 2 is a sectional view of the magnetic head along a line II—II in FIG. 1.

The fundamental arrangement according to the present invention will be described with reference to FIGS. 1 and 2 prior to the detailed description of preferred embodiments of the invention. FIG. 1 is a plan view, and FIG. 2 shows a section taken along II—II in FIG. 1.

A magnetic gap (top margin in the figure) is defined between a lower magnetic material 1 serving also as a substrate and an upper magnetic material 29. Three sets of conductive materials, each set including two layers of the conductive materials, are provided in a stepped means so that they cross the magnetic materials. A lead-out wire 21 is coupled at a portion 9 to a conductive layer 2 which is the first layer from the bottom. The first layer is turned between the magnetic materials and reaches a portion 10 and is then connected at a portion 11 to the third conductive layer. The third conductive layer is again turned, reaching a portion 12, further portions 13 and 14 to form a three-turn coil. Similarly, another three-turn coil begins from a portion 15 of the second conductive layer and then reaches in turn the second, fourth and sixth conductive layers through portions 16, 17, 18, 19 and 20. The respective coils formed by the first, third and fifth conductive layers, and the second, fourth and sixth conductive layers have the same pattern, so that they can be connected through a center tap 28 to provide one coil having substantially the same characteristics on the opposite sides to the center tap. As shown in FIG. 2, the respective conductive layers vary in height in a stepped manner at their end portions opposite to the magnetic gap. The thus formed coil having a center tap, therefore, has the advantages of the possibility of many turns without expanding the head in width, low occurrence of manufacturing defects because the overlapping amount is limited in height under a predetermined value, and low manufacturing cost and easy manufacture because the conductive layers are formed in the same pattern in two layers.

With reference to materials employed in the present invention, the magnetic material is preferably selected from such a material as permalloy, nickel-zinc ferrite, manganese-zinc ferrite, or nickel-cobalt alloy, etc.; the insulating film is preferably made of such a material as silica, alumina, tantalum pentoxide, tantalum nitride, oxide of the above-mentioned magnetic materials, or glass etc.; and the conductive material is preferably selected from such a material as aluminum, copper, platinum, palladium, gold, silver, or other non-magnetic materials having excellent conductivity. As the substrate such a material as glass, alumina, quartz, tantalum carbide, boron nitride, spinel, silicon, ferrite, or other oxide, carbide, nitride and boride, having, chemical resistance may be preferably used. A metallic plate coated with these materials or monocrystal thereof may also be employed. A non-magnetic conductive material such as beryllium copper or metallic plate may be, on the other hand, used. The use of these materials serves to prevent noise because they serves also as a shield.

These materials may be deposited on the substrate by known methods, fox example, by electroplating, evaporation, sputtering, chemical vapor deposition, or electrolytic oxidation method, and formed into any pattern by conventional etching technique. An etching solution is selected, taking into account selective etching properties of materials to be etched and other materials which have already been exposed. It may be preferable that portions at which high precision is required are formed by etching and the other portions by mask sputtering.

It is to be noted that the function of the magnetic head constructed in such a manner that a conductor is crossed between two sheets of magnetic films superimposed on the non-magnetic substrate with their one end open and the other end closed is the same as that of the head which of made in such a manner that a conductor is formed on the magnetic substrate and a magnetic film is then crossed above the conductor. The figure is drawn with reference to the latter head. Further, it is noted that the insulating film is removed in each plan view for convenience of easy understanding of the structure.

Now, description will be made in detail with respect to a preferred embodiment of the invention referring to FIGS. 1 and 2. Conductive films 2 to 7 are superimposed on a substrate 1 of ferrite and are insulated to each other by insulating films 8 interposed therebetween. Each conductive film includes, as shown in FIG. 1, a first portion H elongating in parallel with the margin portion of the substrate 1 and a second and a third portion V each elongating perpendicularly to the same margin portion of the substrate 1. The conductive films 2 to 7 are grouped into three sets each including two layers of the conductive films of the same figure. Three sets of conductive films are so arranged that the second and third portions of the two films of the upper one of the three sets are shorter than those of the lower set.

The conductive film 3 and the insulating film 8 provided thereon are formed with windows 9 and 10 at the respective free end portions of the second and third portions of the conductive film 3 so that corresponding portions of the film 2 are exposed through these windows 9 and 10. In the similar manner, windows 11 and 12 are formed in the conductive film 5 and the insulating film 8 provided thereon so as to expose the corresponding portions of the conductive film 4 through these windows 11 and 12 and windows 13 and 14 are formed in the conductive film 7 and the insulating film 8 provided thereon so as to expose the corresponding portions of the conductive film 6. Further, the respective insulating films 8 provided on the conductive films 3, 5 and 7 are formed with windows 15 and 16, windows 17 and 18 and windows 19 and 20 respectively.

A lead wire 21 is connected to the film 2 at the second portion thereof through the window 9, and lead wire 22 is connected to the film 7 at the first portion thereof through the window 20. Similarly, lead wires 23, 24, 25, 26 and 27 connect the conductive film 2 with the film 4 through the respective windows 10 and 11, the film 3 with the film 5 through the respective windows 16 and 17, the film 4 with the film 6 through the respective windows 12 and 13, the film 5 with the film 7 through the respective windows 18 and 19 and the film 3 with the film 6 through the respective windows 15 and 14, respectively. Further, a lead wire 28 is connected to the film 3 through the window 15. This lead wire 28 serves as a center tap.

Figure 3:
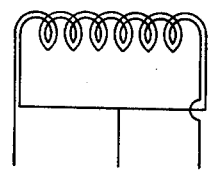
FIG. 3 is a fundamental circuit diagram showing a coil according to the present invention.

The wiring of the magnetic head with such a structure as shown in FIGS. 1 and 2 is equivalent to that of FIG. 3. In FIGS. 1 and 2, each of the three sets of conductive films 2 and 3, 4 and 5, 6 and 7 are of the same pattern to each other, respectively. With the lead 27 as a center there are provided two coil sections, one of which consists of conductive films 2, 4 and 6 with leads 23 and 25 and the other of which consists of the conductive films 3, 5 and 7 with the leads 24 and 26. The conductive films 2 to 7 cross a magnetic film 29 and there is provided a gap between the substrate 1 and the film 29 at one side at the margin of the substrate 1 through the insulating film 8. The magnetic film 29 comes into direct contact, on the other hand, with the substrate 1 through a window 30 at the other side thereof. Thus, a magnetic circuit with a gap is provided.

In such a magnetic head, a plurality of sets, each set consisting of two sheets of conductive films of the same pattern are laminated, and the films in odd numbers of the thus laminated layers of the conductive films are used to provide one of the two sections of a coil and the even-numbered films the other section. The leads 23 to 27 are then used to connect the films and thus provide one coil having two sections with a center tap, each section having substantially the same inductance and electrostatic capacitance, so that the magnetic head can be used without effecting any compensation of the inductance or electrostatic capacitance.

Figure 4:
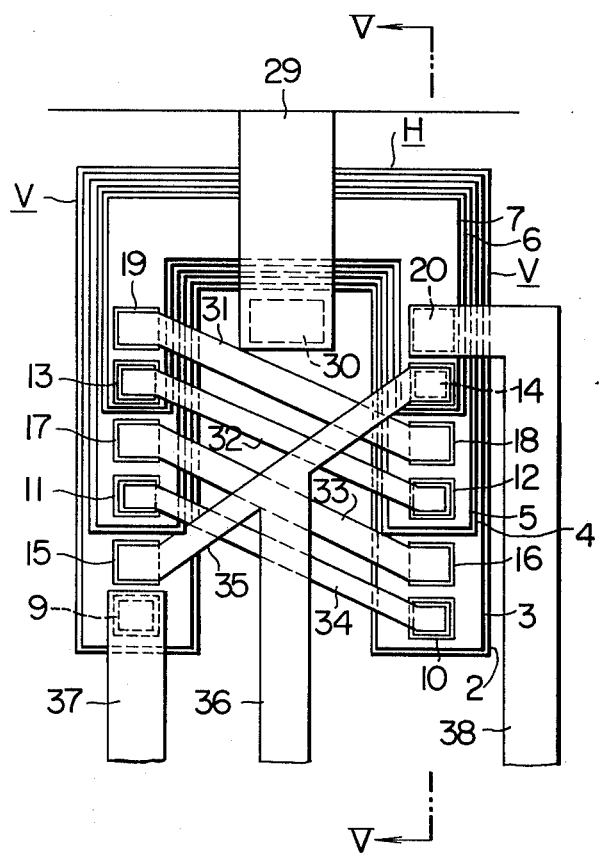
FIG. 4 is a plan view showing another embodiment of the magnetic head according to the present invention.
Figure 5:
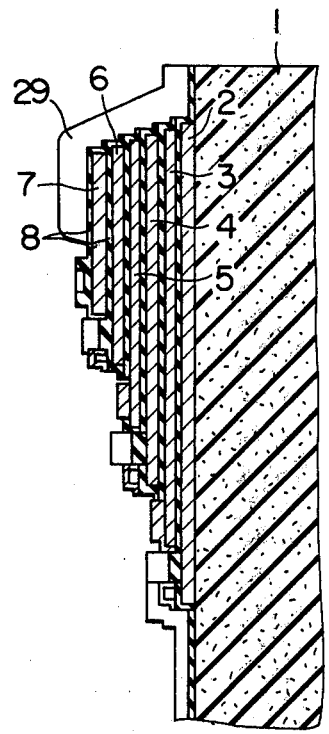
FIG. 5 is a sectional view along a line V—V in FIG. 4.

FIG. 4 is a plan view showing another embodiment of the magnetic head according to the present invention, and FIG. 5 is a longitudinal section along the line V—V in FIG. 4. The same elements as those in FIGS. 1 and 2 are marked with the same symbols. The difference from the magnetic head in FIGS. 1 and 2 exists in that connecting conductors 31 to 35 and lead conductors 36 to 38 are formed by evaporation and etching, and that the lead conductor 35 having a tap 36 is superimposed on the connecting conductors 31 to 34 through an insulating film with center tap 36 elongating from a central position between the windows 14 and 15 on the conductor 35. It is to be noted that the margins of the windows 9 to 14 are insulated to prevent the windows and the overlapping conductive films from short-circuiting.

Figure 6:
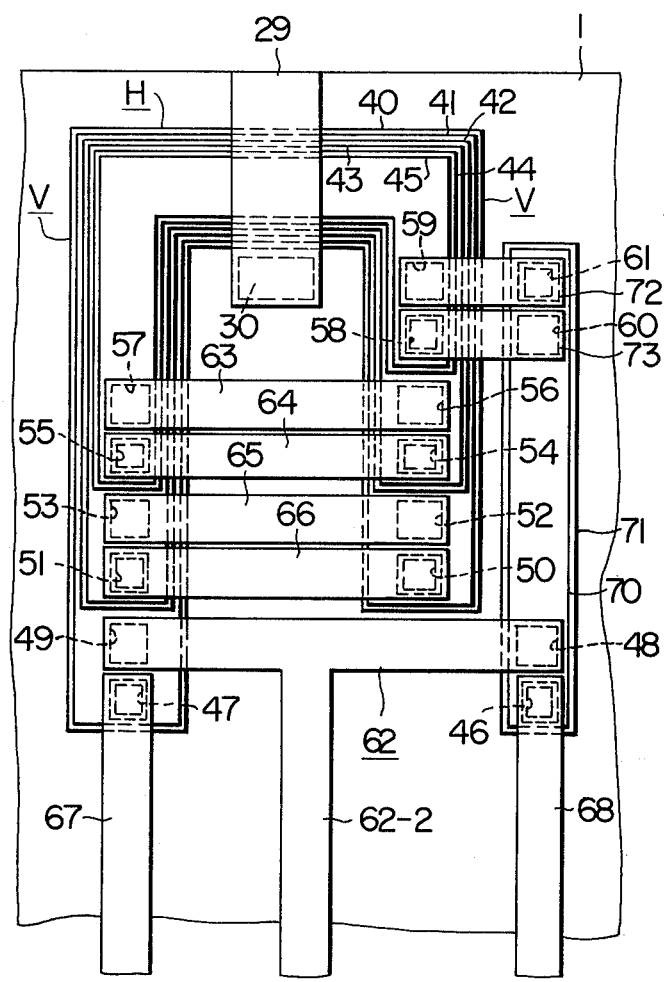
FIGS. 6 to 8 are respective plan views showing other embodiments of the magnetic head according to the present invention.

FIG. 6 is a plan view showing another embodiment of the magnetic head according to the present invention. The same elements as those in FIGS. 1 and 2 are marked with the same signs. On the substrate 1 there are provided conductive films each including a first portion H elongating in parallel with the margin of the substrate 1 at the margin side thereof and a second and a third portion V each elongating from the opposite ends of the first portion H perpendicularly to the margin of the substrate 1. The conductive films are so formed as to be large in length and in width in two layers as they come nearer to the substrate from the top. One of the second and third portions V of each conductive film is longer than the other portion. The magnetic film 29 covers portions of the conductive films and defines a magnetic gap 8 on the margin side of the substrate. The magnetic film 29 comes into magnetic couple, on the other hand, with the ferrite substrate 1 on the other side thereof. The insulating films provided respectively on the conductive films 41, 43 and 45 are formed at both ends with windows 49 and 52, windows 53 and 56, and windows 57 and 59 respectively so that connecting conductors may be connected to these conductive films through these windows. Similarly, the insulating films provided on the respective conductive films 40, 42 and 44 are provided at both ends with windows 47 and 50, windows 51 and 54, and windows 55 and 58, respectively, passing through the respective conductive films 41, 43 and 45 and the respective insulating films provided thereon. The windows enable the connecting conductors to be connected with the conductive films therethrough. Further, conductive by-pass films 70 and 71 elongating perpendicularly to the margin of the substrate 1 are provided on the right side, in the drawing, of the substrate 1 in a overlapping manner but insulated from each other through an insulating film.

Windows 46 and 61 are provided such that they reach the conductive by-pass film 71 and windows 48 and 60 are provided which expose portions of the conductive by-pass film 70. Lead conductors 68 and 67 are connected to the conductive films 71 and 40 through the windows 46 and 47, and a lead conductor 62-2 serving as a center tap is derived from a central position of a conductive film 62 connecting the conductive films 41 and 70 through the windows 49 and 48. Through the windows 50 and 51 the conductive films 40 and 42 are connected by a connecting conductor 66 through the windows 52 and 53 the films 41 and 43 by a conductor 65, through the windows 54 and 55 the films 42 and 44 a conductor 64, and through the windows 56 and 57 the films 43 and 45 by a conductor 63. Similarly, the conductive films 44 and 70, and the films 45 and 71 are respectively connected through the windows 58 and 60 and the windows 59 and 61. In such a structure, the connecting conductors 63 to 66, 72 and 73 have the same length in twos and the conductive by-pass films 70 and 71 are the same in length. Further, the center tap is provided at the central position of the lead conductive film 62, so that the two sections of the coil with the center tap as the center of the two sections show only the differences in inductance and electrostatic capacitance corresponding to the differences in position of the respective windows. It is, therefore, the position of the make the two circuits defined with respect to the central tap are equal to each other in the conductance thereof. The conductive films 40 to 45 are, on the other hand, formed in the same pattern by two layers and provided with the windows, and further the conductive by-pass films 70 and 71 are provided on the substrate on the right side, in the drawing, of the windows 58 and 59 on the conductive films 44, 45. In this structure, therefore, all the connecting conductors and lead conductors can be formed at the same time.

Figure 7:
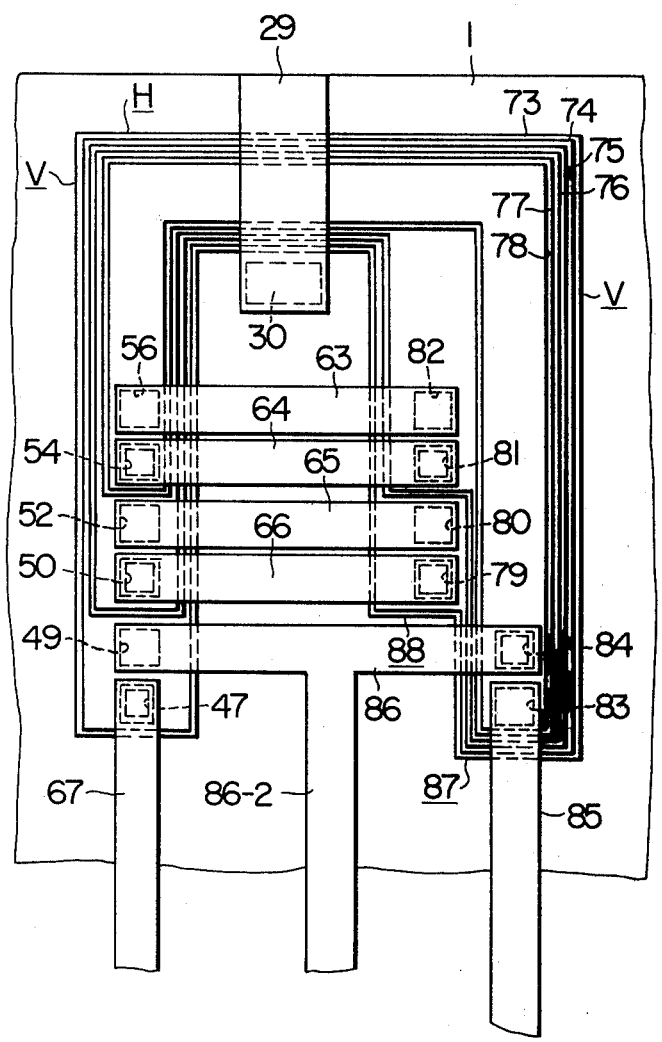

FIG. 7 is a plan view showing another embodiment of the magnetic head according to the invention. The difference from the magnetic head in FIG. 6 is that one of the second and third portions V of conductive films 73 to 76 elongating perpendicularly to the margin of the substrate have two sections, one being a section 87 at which the films are made equal in length and the other being a section 88 made integral with the section 87 at which they are made successively smaller in area from the bottom of the films to the tap thereof in two layers. Windows 84 and 83 are provided to expose portions of conductive films 77 and 78 respectively at their one end at the section 87. Through windows 50 and 74, windows 52 and 80, window 54 and 81 and windows 56 and 82, the conductive films 75 and 73, the conductive films 76 and 74, the conductive films 77 and 75 and the conductive films 78 and 76 are respectively connected to each other by the respective connecting conductors 66, 65, 64 and 63. The conductive films 74 and 77 are connected to each other by the center-tapped connecting conductor 86 through the windows 49 and 84 respectively. A lead 67 is connected to the conductive film 73 through the window 47 and a lead 85 to the conductive film 78 through the window 83. Thus, a coil having two sections each having three turns are formed, one section including the lead 67, the conductive film 73, the connecting conductor 66, the conductive film 75, the connecting conductor 64, the conductive film 77, the lead 86 with the center tap 86-2, and the other section including the same connecting conductor 86, the conductive film 74, the connecting conductor 65, the conductive film 76, the connecting conductor 63, the conductive film 78, and the lead 85.

In such an arrangement, the conductive films 77 and 78 elongate on the section 87 of the conductive films 73 to 76, so that it is not necessary to provide separate conductive films 70 and 71 as in the case with the structure in FIG. 6. In this respect, the conductive films have the reduced occupation in width. Furthermore, the conductive films are of the same pattern in two layers, the connecting conductors 63 to 66 have substantially the same length and the lead 86 has the center tap 86-2 at its central position. This causes the difference of conductance between the two sections of coil to be as small as that in FIG. 6.

Figure 8:
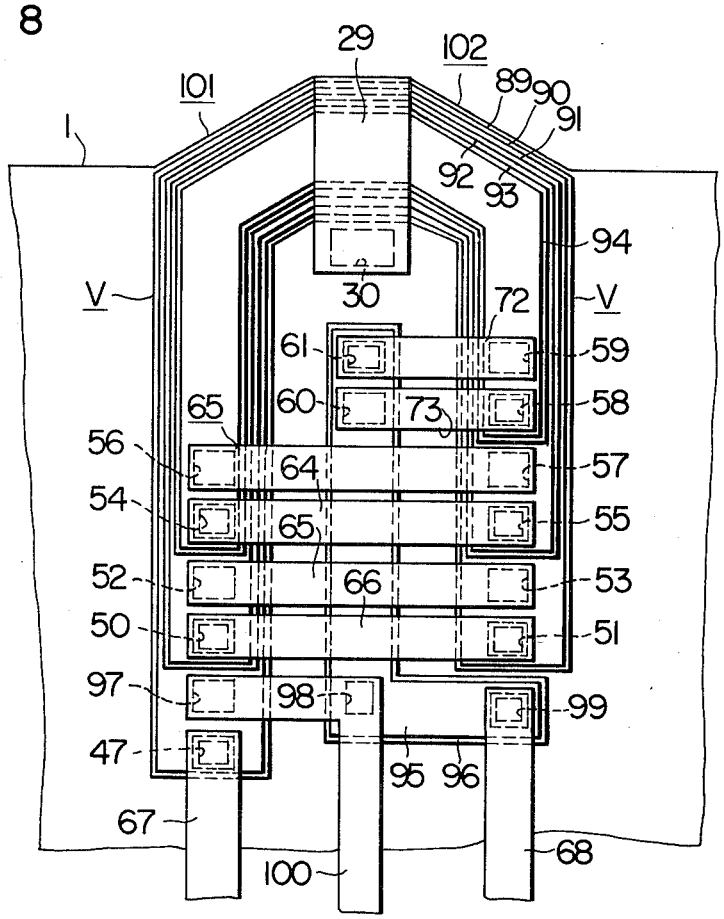

FIG. 8 is a plan view showing another embodiment of a magnetic head according to the present invention. The difference from the magnetic head in FIG. 6 is that conductive films 95 and 96 are further provided between the second and the third portions V of the conductive films 89 to 94 constituting the coil. As a result, the occupation of the magnetic head is not larger in width than that of the conductive films 89 to 94. The elongation of the conductive films 95 and 96 in an L-shaped bend is a modification of a structure having the center tap. A lead 100 provided to serve as a center tap is connected at its one end to the conductive film 90 through the window 97 and connected at the bend thereof to the conductive film 95 through a widow 98 formed at the center between the windows 97 and 99. Thus, the coil is divided into two sections which are the same in length as in FIG. 6. In FIG. 8, the conductive films are inclined along the edge of the substrate to form portions 101 and 102 on both sides of the magnetic film 29. This allows the magnetic gap at the top of the magnetic film to be protruded to recording medium. Further, since a plurality of the thus formed magnetic heads are arranged side by side on one substrate in practical use, a space or channel is provided between the portion 101 of the conductive films of one magnetic head and the portion 102 of the conductive films of another magnetic head adjacent to the one magnetic head. The space or channel serves as a path through which air flows when the magnetic heads have access to the recording medium. Thus, the magnetic heads can be brought to the recording medium as near as 0.3 μm if they come near to the recording medium as a floating structure. This improves in efficiency in the magnetic head. It is to be noted that it is difficult to made the distance between the magnetic head and the recording medium less than 1.0 μm in such a structure as shown in FIG. 6 in which the substrate is flat at its end surface.

In the embodiments mentioned above, the lower conductive film of each set of two conductive films of the same pattern is connected to the conductor through the window passing through the upper conductive film, but it may be connected to the conductor as a laterally elongating portion of the lower conductive film elongated by an amount corresponding to the area of the window to expose the lower conductive film through a window formed only in the insulating film at the corresponding portion above the elongated portion by method of etching.

In the following, the magnetic head according to the present invention will be described in view of its method with reference to the drawings.

Figure 9:
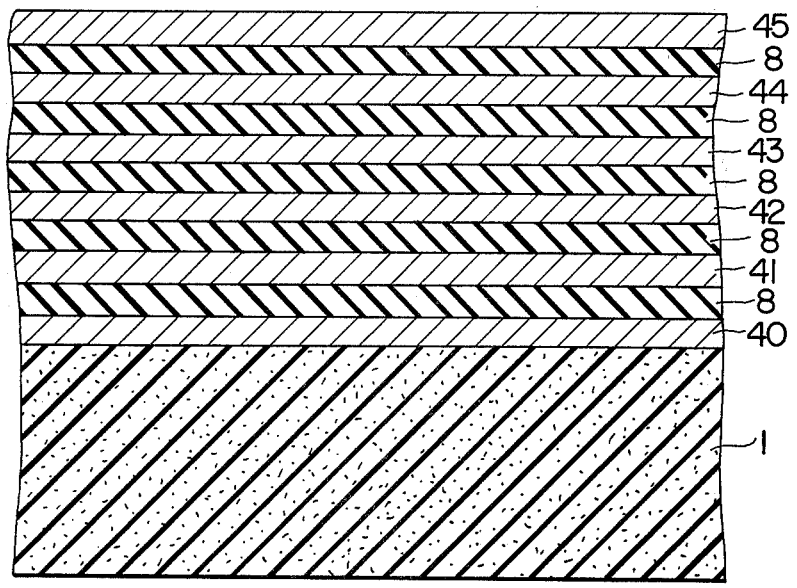
FIG. 9 is a longitudinal sectional view showing a substrate, with which the method according to an embodiment of the present invention begins, and laminated layers on its surface.
Figure 10A:
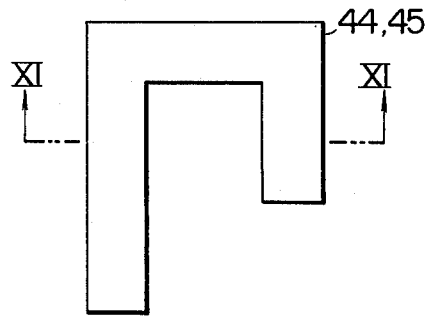
FIGS. 10a to 10f are respective plan views showing steps in one embodiment of the method according to the present invention.

FIG. 9 is a longitudinal sectional view showing an arrangement in which the conductive films 40 to 45, alternating with the insulating films 8, are laminated on the substrate 1. In order to form such laminated films, methods such as evaporation, sputtering, chemical vapor deposition or ion plating method are used in a repetitive manner. It is preferrable that the multi-target sputtering method or a multi-source evaporation method is employed because the formation of such multi-layered films without breaking vacuum after the substrate has been set in a vacuum device not only prevents the contamination at the interface between the layers but also provides an easy process. In the following, one example will be described with reference to a method for forming a magnetic head which is similar to the magnetic head with a six-turn coil shown in FIG. 6. FIG. 9 shows a structure in which eleven layers are stacked which comprise six layers of conductors and insulating films each sandwiched between every adjacent two conductors. FIGS. 10a to 10f are plan views each showing a step in the method. The same signs as those in FIG. 6 are used. The laminated layers are etched by a conventional etching method as shown in FIG. 10a. The longitudinal section along XI—XI in FIG. 10a is shown in FIG. 11. In order to etch the layers into such a pattern as shown in FIGS. 10a and 11, a photoresist pattern is first formed on the conductive film 45 which is then etched. When, in this step, aluminum or gold is used as the conductive film and a film of silicon dioxide as the insulating film 8, the conductive film 45 of the thus formed pattern is advantageously resistant to an etching solution for the insulating film 8, so that the conductive film 45 serves as a mask to enable only the insulating film 8 to be etched. The conductive film 44, the second layer from the top, is then etched and the insulating film 8 lying thereunder is further etched in the same manner. If the conductive and insulating films cannot be etched selectively, an etching method is employed in which the already formed patterns are covered and protected with the photoresist.

Figure 10B:
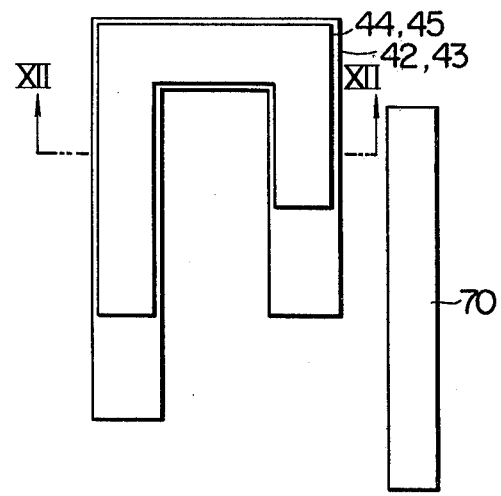
Figure 10C:
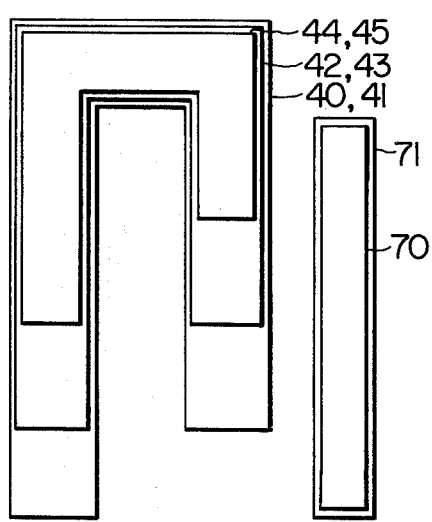
Figure 10D:
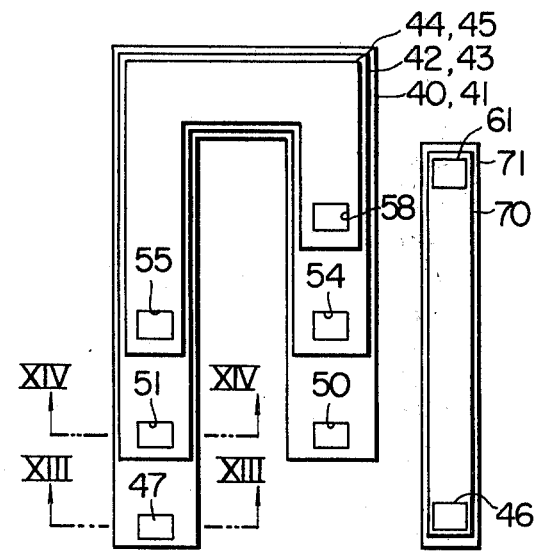
Figure 10E:
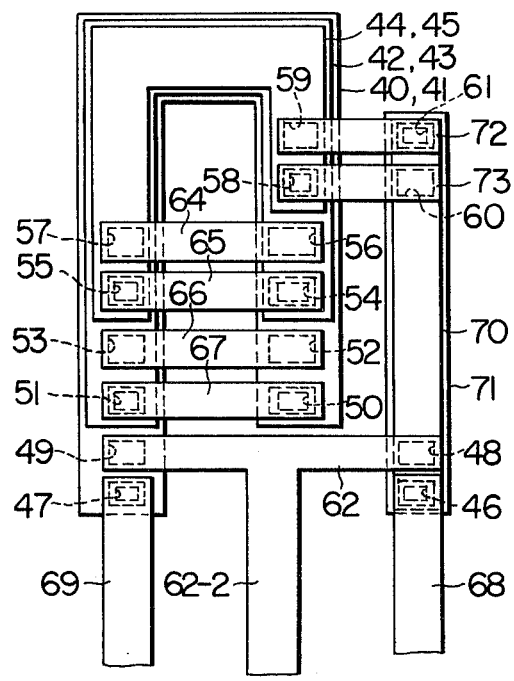
Figure 11:
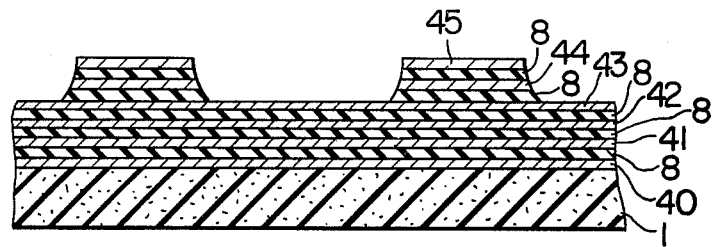
Figure 12:
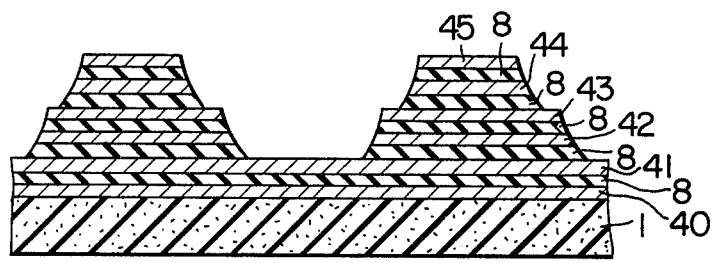
FIG. 12 is a sectional view along a line XII—XII in FIG. 10b.
Figure 13:
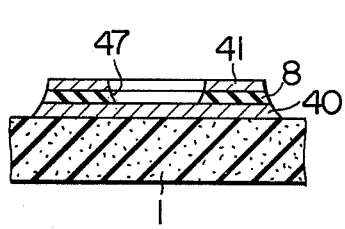
FIG. 13 is a sectional view along a line XIII—XIII in FIG. 10d.
Figure 14:
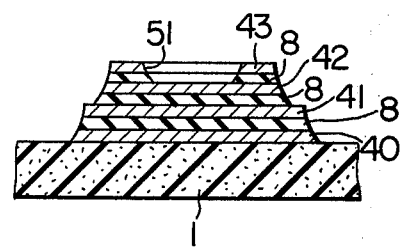
FIG. 14 is a longitudinal sectional view along a line XIV—XIV in FIG. 10d.

The conductive film 43, the third insulating film 8 from the top insulating layer, the conductive film 42, and the fourth insulating film 8 are then etched in that order into such a pattern as shown in FIG. 10b by the same manner as that in FIG. 10a. Similarly the conductive film 41, the fifth insulating film 8 and the conductive film 40 are further etched into a pattern as shown in FIG. 10c. A section along XII—XII in FIG. 10b is shown in FIG. 12. Subsequently, as shown in FIG. 10d, the conductive and insulating films are etched so as to form the windows 46, 47, 50, 51, 54, 55, 58 and 61 to enable conductors to be connected to the respective conductive films therethrough. The windows 48, 49, 52, 53, 56, 57, 59, 60 are then etched with the already formed pattern covered with an insulating film with the exception of the windows 46, 47, 50, 51, 54, 55, 58 and 61 (of source stepped parts are covered by insulater). Sections along XIII—XIII and XIV—XIV are shown in FIGS. 13 and 14, respectively. The lead 62 and conductors 64 to 69, 72, 73 for connecting the respective conductive films are attached as shown in FIG. 10e to provide the six-turn coil. In the figure, 62-2 denotes the center tap. The circuit diagram of this coil is represented as shown in FIG. 3, and it is understood that the two sections of the coil, each section having three turns, are connected in an equilibrium through the center tap.

Figure 10F:
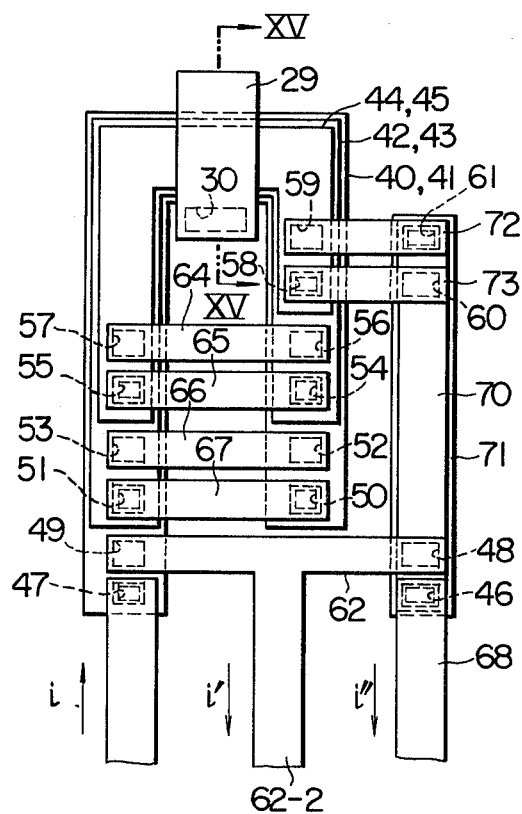
Figure 15:
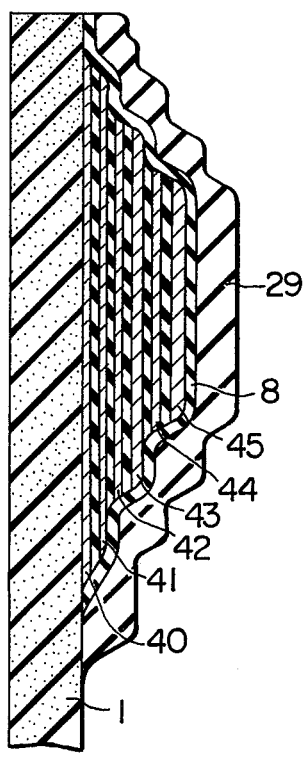
FIG. 15 is a longitudinal sectional view along a line XV—XV in FIG. 10f.

The magnetic film 29 is then formed over the first portion of the laminated conductive films parallel to the margin of the substrate as shown in FIG. 10f. Thus, the thin film magnetic head element having the six-turn coil has been accomplished. A section along XV—XV in FIG. 10f is shown in FIG. 15.

In the above-mentioned manufacturing method, the required lamination is primary formed on the substrate all over the surface and useless portions are then removed therefrom by etching. This method can be simplified as follows. A lamination having a pattern substantially approximate to a final pattern is formed by an evaporation method or the like with the aid of a fixed mask on a section near to the margin of the substrate on which no overlapping of the conductive layers occurs and a high precision in dimension is required and with the aid of a moving mask on a section on which the requirement of the high precision in dimension is not so critical and the overlapping of the conductive layers appears. The thus formed lamination is then etched into a precise pattern by photomash etching. This causes the etching to be accomplished in a short time and provides a higher precision in shape and dimension.

The magnetic head according to the present invention has a small amount of overlapping at its side portions, so that it can be surely insulated with a thin insulating film. It is, therefore, possible to reduce the total thickness of the magnetic head below 70% in comparison with the conventional head.

The lateral width of the head will be described with reference to the structure in FIG. 6.

In FIG. 6, the magnetic head could be formed in the following dimensions: each of the conductive films was 2 $\mu$m in thickness; each of the insulating films 1 $\mu$m in thickness; the difference 300 $\mu$m in the longitudinal direction between upper set of two conductive films and lower set of two conductive films among the films 40 to 45 at their end portions; the uppermost conductive film 120 $\mu$m in width; the side etching 3 $\mu$m in amount when each two layers of insulating and conductive films were etched; the offset of the pattern 14 $\mu$m in width; the lowermost conductive film 40 170 $\mu$m in width, and 1450 and 1150 $\mu$m in total length from the gap, respectively; the occupation of the conductive film 40 900 $\mu$m in length in the first portion thereof parallel to the margin of the substrate; and each of the conductors 70 and 71 200 $\mu$m in width and 1100 $\mu$m in length. In this magnetic head, the electrical unbalance between the two coil sections on both sides of the center tap was within 5 to 30%. Thus the electrical unbalance was so small that no reading error occurred even if the magnetic head was used as one for electric computers without any modification.

The magnetic head can be made as small as 30 to 50% in lateral width in comparison with the conventional magnetic head, and remarkably improved also in manufacturing yield.

We claim:

1. A magnetic head comprising:

a substrate;

magnetic core means superimposed on said substrate such that it elongates from a margin portion of said substrate perpendicularly to a direction of movement of a recording medium and is arranged so as to define a magnetic gap at one end of said magnetic core means on the margin portion of said substrate and come into magnetic connection with said substrate on the other end of said magnetic core means;

an even number of laminated conductive films each having a first portion extending to cross said magnetic core means and a second and a third portion respectively extending from the opposite ends of said first portion perpendicularly to the margin portion of said substrate;

insulating films provided among said conductive films so as to insulate said conductive films from one another;

connecting conductors for successively connecting said conductive films in such a manner that, assuming said conductive films are numbered in order from the top to the bottom, the free end of the second portion of the first one of said conductive films is connected with the free end of the third portion of the third one of said conductive films, the free end of the second portion of the second one of said conductive films is connected with the free end of the third portion of the fourth one of said conductive films, the free end of the second portion of the third one of said conductive films is connected with the free end of the third portion of the fifth one of said conductive films and the same manner is repeated till the free end of the third portion of the bottom one of the said conductive films is connected with the free end of the second portion of the conductive film having a number smaller by two than the number of said bottom one so as to form two sections of a coil;

a connecting conductive having a center tap, one end of which is connected with the free end of the second portion of the conductive film having a number smaller by one than the number of said bottom one and the other end of which is connected with the free end of the third portion of the second one of said conductive films so as to connect the two sections of the coil;

a first head-out conductor connected at its one end to the free end of the third portion of said first one of said conductive films, and a second lead-out conductor connected at its one end to the free end of the second portion of said bottom one of said conductive films.

2. A magnetic head as set forth in claim 1, wherein said conductive films are of the same pattern in two layers from the top to the bottom thereof and any upper two layers of the same pattern of said conductive films are smaller in area than the directly lower two of the same pattern of said conductive films.

3. A magnetic head as set forth in claim 1, wherein each of said connecting conductors is the same in length.

4. A magnetic head comprising:
a substrate;
two sheets of overlapped magnetic films elongating from the margin of said substrate perpendicularly to a direction of movement of a recording medium and arranged so as to define a magnetic gap on the margin portion of the substrate and come into magnetic connection with said substrate;
an even number of laminated conductive films each having a first portion crossing between said magnetic films and a second and a third portion respectively elongating from the opposite end of said first portion perpendicularly to the margin portion of said substrate, said each of said second and third portions of said conductive films being the same in area in two layers from the top to the bottom thereof, any upper two of the same area of each of said second and third portions of said conductive films being smaller in area than the directly lower two of the same area of those of said conductive films;
connecting conductors for successively connecting said conductive films in such a manner that, assuming said conductive films are numbered in order from the top to the bottom, the free end of the second portion of the first one of said conductive films is connected with the free end of the third portion of the third one of said conductive films, the free end of the second portion of the second one of said conductive films is connected with the free end of the third portion of the fourth one of said conductive films, the free end of the second portion of the third one of said conductive films is connected with the free end of the third portion of the fifth one of said conductive films and the same manner is repeated till the free end of the third portion of the bottom one of said conductive films is connected with the free end of the second portion of the conductive film having a number smaller by two than the number of said bottom one, two connecting conductor of each pair of said two pairs of connecting conductors being the same in length;
a pair of by-pass conductive films superimposed on said substrate perpendicularly to the margin of said substrate and insulated from each other;
a connecting conductor connecting the free end of the third portion of said first one of said conductive films with one end of the lower one of said by-pass conductive films;
a connecting conductor connecting the free end the third portion of said second one of said conductive films with one end of the upper one of said by-pass conductive films;
a connecting conductor having a center tap, one of which is connected to the free end of the second portion of the conductive film having a number smaller by one than the number of said bottom one and the other end of which is connected with the other end of said upper one of said by-pass conductive films;
a lead-out conductor connected at its one end to the free end of said bottom one of said conductive films; and
a lead-out conductor connected at its one end to the other end of said lower one of said by-pass conductive films.

5. A magnetic head as set forth in claim 4, wherein, said by-pass conductive films are disposed in parallel to said second and said third portions and therebetween.

* * * * *